(12) United States Patent
Fay et al.

(10) Patent No.: US 9,980,014 B2
(45) Date of Patent: May 22, 2018

(54) METHODS, INFORMATION PROVIDING SYSTEM, AND RECEPTION APPARATUS FOR PROTECTING CONTENT

(71) Applicant: Saturn Licensing, New York, NY (US)

(72) Inventors: Luke Fay, San Diego, CA (US); Brant Candelore, San Diego, CA (US); Frederick J. Zustak, Poway, CA (US); Peter Shintani, San Diego, CA (US)

(73) Assignee: SATURN LICENSING LLC, New York, NY (US)

( * ) Notice: Subject to any disclaimer, the term of this patent is extended or adjusted under 35 U.S.C. 154(b) by 0 days. days.

(21) Appl. No.: 13/930,880

(22) Filed: Jun. 28, 2013

(65) Prior Publication Data

US 2015/0007215 A1    Jan. 1, 2015

(51) Int. Cl.
*H04N 21/83* (2011.01)
*H04N 21/462* (2011.01)
(Continued)

(52) U.S. Cl.
CPC ......... *H04N 21/835* (2013.01); *H04N 21/462* (2013.01); *H04N 21/4627* (2013.01);
(Continued)

(58) Field of Classification Search
CPC .......... H04N 21/2389; H04N 21/4385; H04N 21/42607; H04N 21/25; H04N 21/25825; H04N 21/2347; H04N 21/2541; H04N 21/4405; H04N 21/4623; H04N 21/440218; H04N 21/44227; H04N 21/2668; H04N 21/4345; H04N 21/23473; H04N 21/235; H04N 21/2365; H04N 21/4627; H04N 7/0122; H04N 21/4342; H04N 7/0125; H04N 21/23439; H04N 21/234; H04N 21/835
(Continued)

(56) References Cited

U.S. PATENT DOCUMENTS 6,233,295 B1    5/2001  Wang
2002/0191712 A1  12/2002  Gaddam et al.
(Continued)

OTHER PUBLICATIONS

International Search Report and Written Opinion dated Oct. 10, 2014, in International Application No. PCT/US 14/39729.
(Continued)

*Primary Examiner* — Pankaj Kumar
*Assistant Examiner* — Alazar Tilahun
(74) *Attorney, Agent, or Firm* — Oblon, McClelland, Maier & Neustadt, L.L.P.

(57) ABSTRACT

An information providing system, reception apparatus, and methods thereof are provided for protected content data. The method for providing the protected content data includes generating or receiving the protected content data, and generating a digital television broadcast signal including at least one data field sync segment and the protected content data. The digital television broadcast signal is provided to a reception apparatus. The at least one data field sync segment carries information necessary to identify a framing structure of the digital television broadcast signal and includes one of security information for accessing the protected content data and a location of the security information.

6 Claims, 15 Drawing Sheets

(51) Int. Cl.
  *H04N 21/835* (2011.01)
  *H04N 21/4627* (2011.01)
  *H04N 21/61* (2011.01)
  *H04N 21/234* (2011.01)
  *H04N 21/2343* (2011.01)

(52) U.S. Cl.
  CPC ....... *H04N 21/6112* (2013.01); *H04N 21/234* (2013.01); *H04N 21/23439* (2013.01)

(58) Field of Classification Search
  USPC ...................... 725/25, 27, 28, 29, 30, 31, 36
  See application file for complete search history.

(56) References Cited

U.S. PATENT DOCUMENTS

| | | | |
|---|---|---|---|
| 2006/0077300 A1* | 4/2006 | Cheon et al. ................ | 348/614 |
| 2007/0101370 A1* | 5/2007 | Calderwood ...... | H04N 5/44513 |
| | | | 725/47 |
| 2007/0258586 A1* | 11/2007 | Huang et al. ................ | 380/201 |
| 2009/0031384 A1* | 1/2009 | Brooks et al. ................ | 725/127 |
| 2010/0325651 A1* | 12/2010 | Kawai ............................. | 725/25 |
| 2011/0075990 A1 | 3/2011 | Eyer | |
| 2011/0088075 A1 | 4/2011 | Eyer | |
| 2011/0164686 A1* | 7/2011 | Lu ................. | H04N 21/234327 |
| | | | 375/240.25 |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2013/0055313 A1 | 2/2013 | Eyer | |
| 2013/0103716 A1 | 4/2013 | Yamagishi | |
| 2013/0145414 A1 | 6/2013 | Yamagishi | |

OTHER PUBLICATIONS

U.S. Appl. No. 13/559,188, filed Jul. 26, 2012, Kitazato.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/924,907, filed Jun. 24, 2013, Eyer.
U.S. Appl. No. 13/927,667, filed Jun. 26, 2013, Yamagishi.
Mexican Office Action dated Mar. 15, 2017 in Patent Application No. MX/a/2015/015109 (with English translation).

* cited by examiner

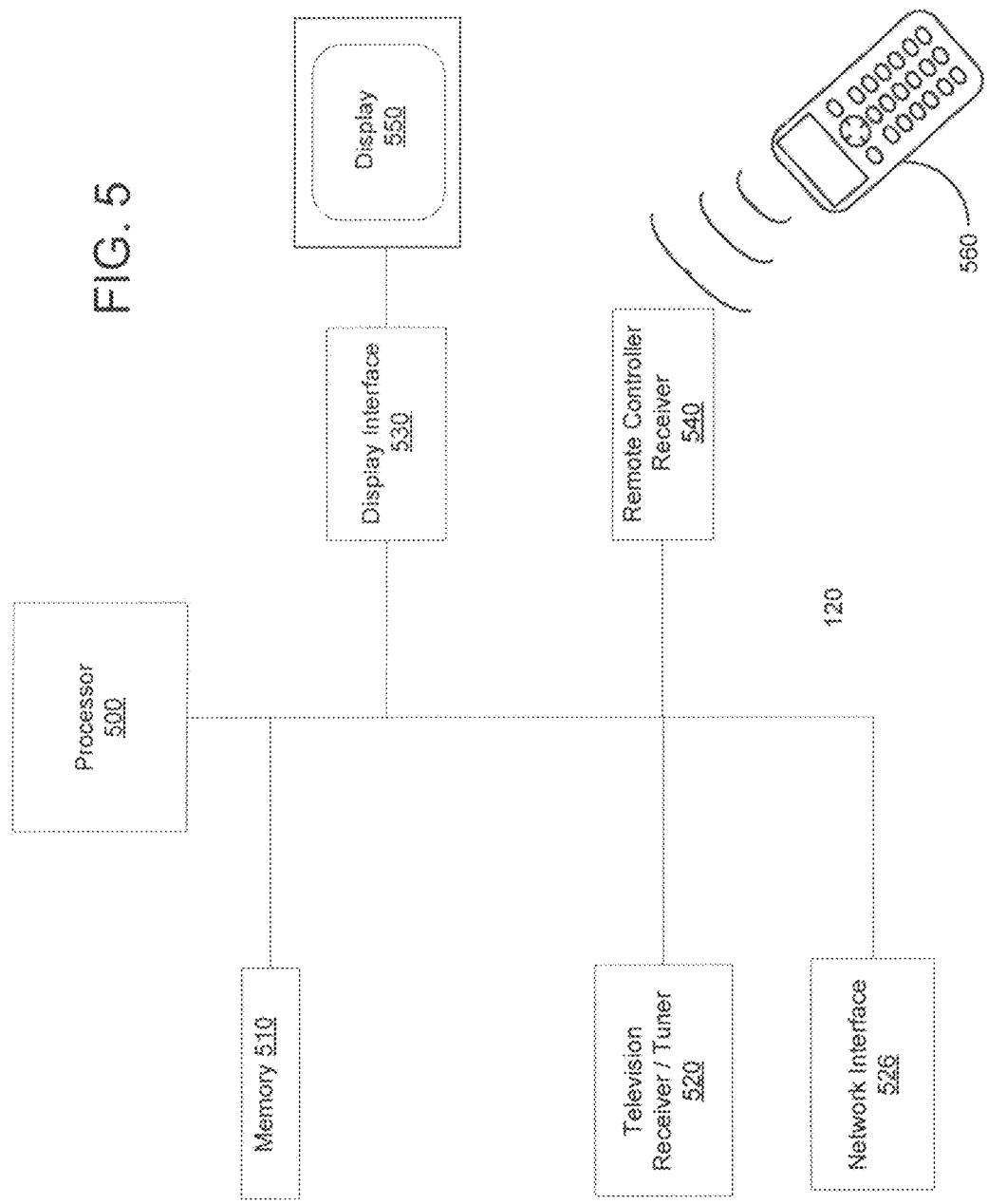

METHODS, INFORMATION PROVIDING SYSTEM, AND RECEPTION APPARATUS FOR PROTECTING CONTENT

BACKGROUND OF THE INVENTION

Field of the Invention

Embodiments described herein relate generally to protecting distributed content.

Background

Modern televisions and set top boxes are capable of receiving broadcast television services. These broadcast television services are broadcast by broadcast providers and only intended for free consumption by the general public. Satellite and cable providers typically pay fees to retransmit the broadcaster signals on their own respective systems. However, certain entities are taking broadcaster signals and re-transmitting them without paying retransmission fees.

SUMMARY OF THE INVENTION

Embodiments of the present disclosure relate to addressing the problem of unauthorized re-transmission of broadcast signals. Although the present disclosure is primarily described with respect to the re-transmission of broadcast signals, the embodiments can be applied to content distributed via any other transmission media/scheme such as cable, satellite, radio, a mobile network, the Internet, etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a processor-centric block diagram of an exemplary reception apparatus;

DETAILED DESCRIPTION

Figure 1:
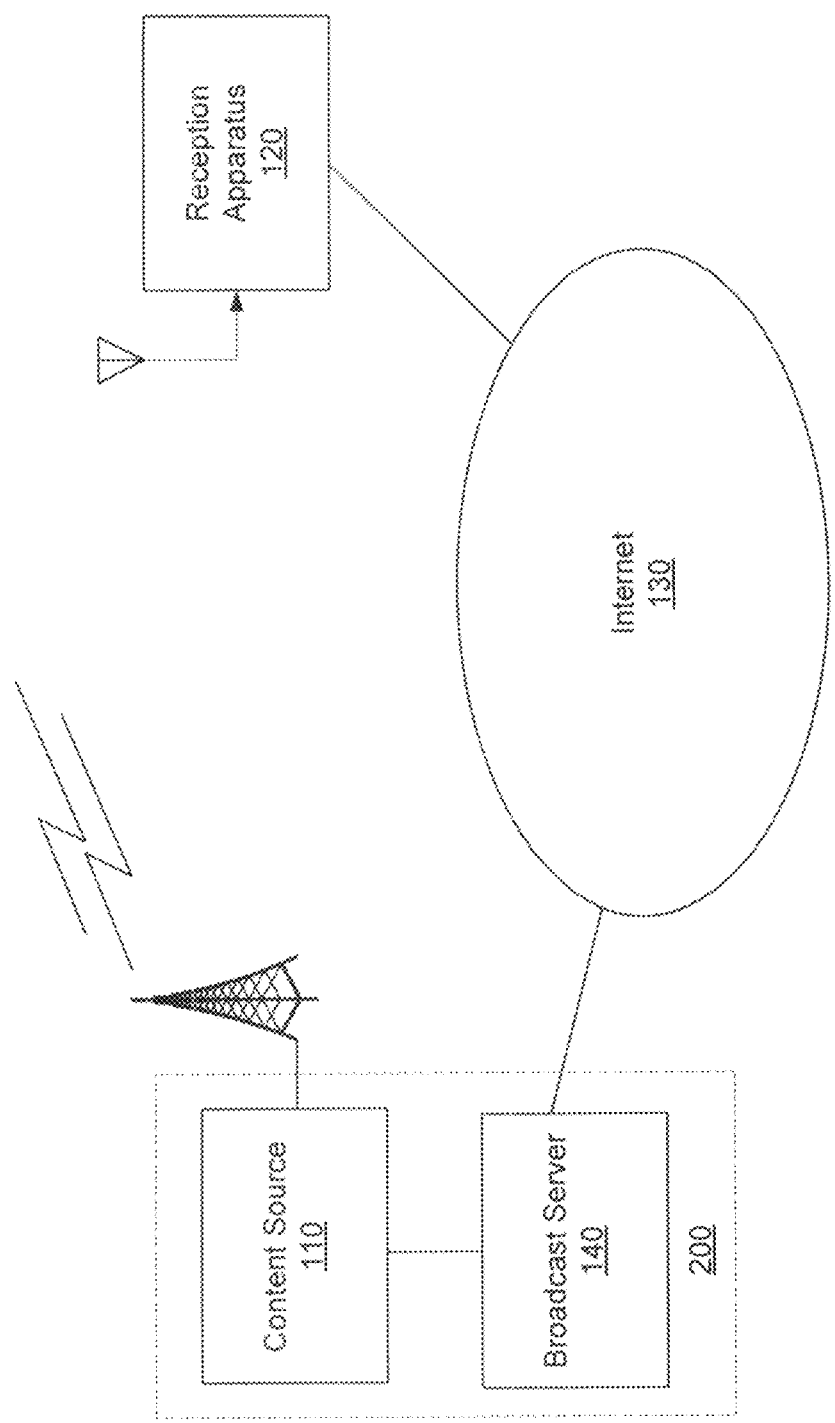
FIG. 1 illustrates an exemplary broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

FIG. 1 illustrates an exemplary broadcast system 2, which includes an information providing system 200 and a reception apparatus 120 (e.g., a digital television receiver device) optionally connected to each other via one or more communication networks such as the Internet 130. The information providing system 200 is associated with a service provider (e.g., a television broadcaster) that provides services, including content such as television programs. The information providing system 200 includes a content source 110 and an optional broadcast server 140. Although FIG. 1 illustrates one content source 110, one broadcast server 140, one reception apparatus 120, and one information providing system 200, it should be understood that any number of each may be included in the broadcast system 2.

According to certain embodiments of the present disclosure, the information providing system 200 provides protected and unprotected content. The protected and unprotected content differ in one or more ways, for example in video quality (e.g., standard-definition versus high-definition television, high-definition versus ultra high-definition television), audio quality (e.g., stereo versus 5.1 audio), interactivity (e.g., interactive versus non-interactive), service levels (e.g., broadcaster supported features, hyperlinks, access to further information from the broadcaster, etc.)

In certain embodiments, the unprotected content is scalable such that it can be enhanced by the protected content (e.g., high-definition video layer added to a standard-definition video layer, 5.1 audio layer added to a stereo audio layer, etc.). In the case of scalable video content, in one embodiment, the protected content when combined with the unprotected content produces a higher quality version (e.g., a high-definition television version) of the content. In the case of interactivity, interactive features are transmitted as protected content and used to supplement the unprotected content.

Currently, television broadcasters are required to send content in the clear, as mandated by Congress. However, the mandate only requires clear standard-definition content. Accordingly, in one embodiment, the unprotected content is standard-definition content and the protected content is a higher-definition version of the same content or a higher-definition layer of the same content in the case of scalable video.

The protected content is content that has been protected in some way to prevent unauthorized access. The protection can be applied by one or more conditional access or digital rights management (DRM) systems. For example, the content may be protected using one or a combination of scrambling, encryption, or any other predetermined algorithms to prevent unauthorized access. In certain embodiments, security information is required in order to access the protected content. It is noted that each service provider may use the same or one or a combination of different methods to protect their respective content.

In one embodiment, the information providing system 200 scrambles content data with a scrambling key to generate protected content, distributes the scrambled content data to the information reception apparatus 120, encrypts the scrambling key, and sends the encrypted scrambling key to the reception apparatus 120. The scrambling key (or encrypted scrambling key) in this embodiment is an example of security information needed to access the protected content.

The encrypted scrambling key is embedded into the physical layer of a digital television broadcast signal (e.g., one or more field syncs) for the purpose of preventing unauthorized receivers from receiving and/or decoding at least a portion of the television broadcast signal. In another embodiment, the encrypted scrambling key is separately provided to the reception apparatus 120, for example by the broadcast server 140 via the Internet 130. In other embodiments, the encrypted scrambling key is separately provided to the user on a portable storage device (e.g., compact disc, flash memory) or via one or a combination of other communication networks (e.g., telephone network, cellular network, local area network, etc.). In one embodiment, the scrambling key is pre-stored in the reception apparatus 120, for example by the manufacturer. It should be noted that one or a combination of the methods described above to provide the encrypted scrambling key are applicable to providing any other type of security information.

According to an embodiment of the present disclosure, the security information is used in a conditional access system that supports Digital Video Broadcasting (DVB) Simulcrypt. Such a conditional access system is described in ATSC standard A/70 Part 2, which is incorporated herein by reference in its entirety.

Simulcrypt is used to encrypt digital television broadcast signals and services and other IP-delivered services for broadcast on an IP delivery framework. Simulcrypt uses key streams known as Entitlement Management Messages (EMMs) and Entitlement Control Messages (ECMs). The ECM includes an encrypted version of a 48 bit secret key which is used by the information providing system 200 to scramble the content data. The EMM is used to authorize the reception apparatus 120 to decrypt the ECM packet and obtain a 48 bit secret key. This key is used by the reception apparatus 120 to descramble the scrambled content data.

The ECM is transported as an Internet Protocol Security (IPsec) User Datagram Protocol/Internet Protocol (UDP/IP) packet. Each IPSec packet header includes a 32 bit Security Parameter Index (SPI). The SPI in the IPSec packet header is used by the reception apparatus 120 to retrieve a corresponding private key from a key management system. This private key is then used by the reception apparatus 120 to decrypt the ECM packet. The decrypted ECM packet includes a 48 bit secret key which is used by the reception apparatus 120 to access (e.g., descramble) the protected content.

In this embodiment, the security information includes 82 bit segments of an ECM packet. In another embodiment, the security information includes both the 82 bit segments of the ECM packet which includes an encrypted scrambling key and the 82 bit segments of the EMM packet which includes information needed for decrypting the 48 bit secret key. In one embodiment, the EMM packet does not contain an actual decryption key. It has an SPI, just like the ECM packet, which is used to instruct a receiver on where to obtain the private key needed for decrypting the 48 bit secret key. This behavior is described below. The EMM packet segments are sent sequentially by the information providing system 200 until the complete packet has been sent. Then the ECM packet portions are sent sequentially until the complete packet has been sent. The entire EMM packet is sent first followed by a large (and variable) number of ECM packets. After a large (and variable) number of ECM packets are sent, the process starts over with the sending of another EMM packet.

The reception apparatus 120 receives the transmitted broadcast signal including the protected and unprotected content. The reception apparatus 120 is only configured to display the unprotected content when, for example, the reception apparatus 120 is a legacy device that does not support protected content, or a license to view the protected content has not been offered to or accepted by a user or entity of the reception apparatus 120.

When the reception apparatus 120 supports protected content, the reception apparatus 120 is configured to retrieve security information needed to access (e.g., descramble or otherwise decode) the protected content. The security information is provided in a manner that does not interfere with the operation of the legacy device. Depending on the embodiment, the reception apparatus 120 either accesses the protected content for direct presentation to the user or combines the unprotected and accessed protected content prior to presentation to the user.

For example, according to one embodiment, the unprotected version of the content data would be formatted as Standard-Definition Television (SDTV) which is freely received and decoded by any broadcast receiver. The protected content is formatted in High-Definition Television (HDTV) and is only receivable and/or accessible by broadcast receivers that support protected content and for which a user has accepted a license agreement with the service provider.

The reception apparatus 120 displays decoded video data on a display device (e.g., a liquid crystal, organic light-emitting diode, active matrix organic light-emitting diode, or plasma display) and outputs decoded audio data through an audio system.

In certain embodiments, the protected content provided by the information providing system 200 is tied to a license. The license may apply only to the unprotected content or to both the protected and unprotected content in other embodiments. The license provides one or more service providers with control over, and a possible legal basis for, who gets access to their content (e.g., to control retransmission rights). In one embodiment, the license is tied to each broadcast receiver.

Depending on the embodiment, one or a combination of receipt of the protected content, receipt of the security information, or use of the security information is only permissible by the general public, for personal use, to which a free license is granted. A free license, however, is not granted to other entities, for example entities that retransmit service provider content. In one embodiment, a user that receives the protected content is required to accept a license agreement prior to presentation of the protected content.

For example, the user may be required to accept a license agreement that is presented to the user by the reception apparatus 120 before the protected content from a particular service provider can be presented to the user. Acceptance of the license may be service provider specific or apply to a plurality of different service providers. The user accepts the license via a remote control, in one example. The displayed license can be generate, for example based on license data included in the television broadcast signal or obtained over another communication medium such as the Internet.

Figure 2A:
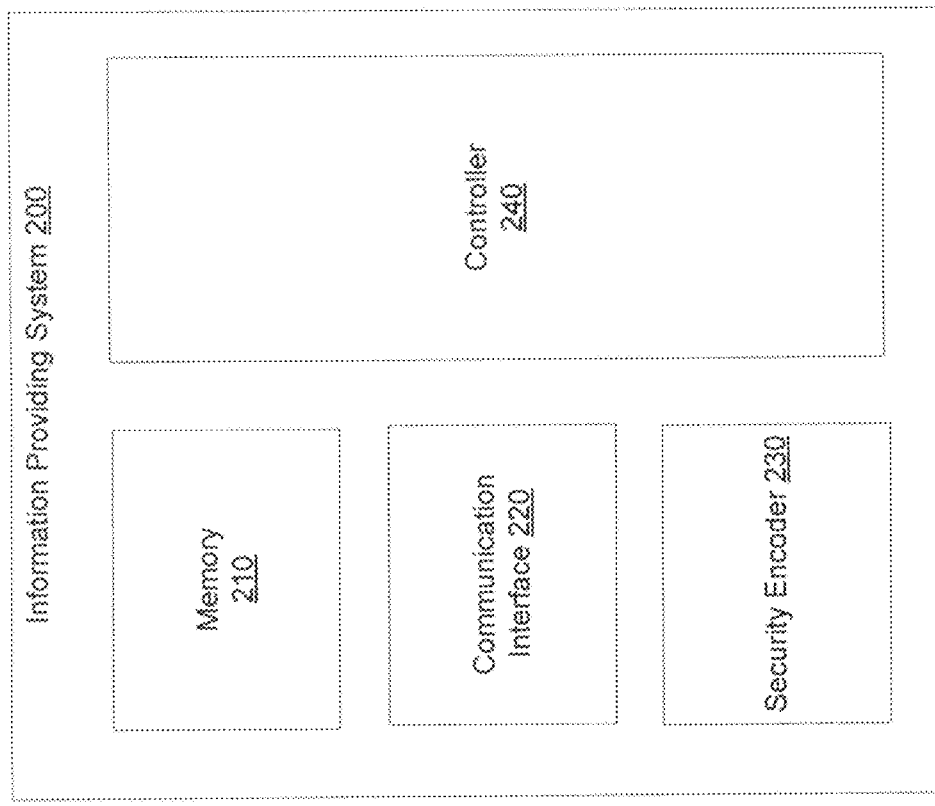
FIG. 2A is a block diagram of an exemplary information providing system.

FIG. 2A is a block diagram of the information providing system 200. This system 200 includes a memory 210, a communication interface 220, a security encoder 230, and a controller 240. The memory 210 can be implemented using disc storage form as well as other forms of storage such as non-transitory storage devices including for example network memory devices, magnetic storage elements, magneto-optical storage elements, flash memory, core memory and/or other non-volatile storage technologies. It is noted that the term "non-transitory" is a limitation of the medium itself (i.e., tangible, not a signal) as opposed to a limitation on data storage persistency (e.g., RAM vs. ROM).

The memory 210 is configured to store one or a combination of the content to be distributed, in protected and/or unprotected versions, encoder information used by the security encoder 230 to generate the protected content, and security information used to access the protected content. The encoder information and security information need not be the same information. Further, the security information itself may be separately protected. For example, the memory 210 stores a public key provided by a key management system and supplies the public key to the controller 240 to encrypt the security information. The memory 210 is also configured to store the security information. In certain embodiments, at least one of the encoder information and the security information is generated by the controller 240. At least one of the encoder information and the security information may also be changed on a periodic basis.

The security encoder 230 generates the protected content using the encoder information. As described above, the security information may further be encrypted (e.g., by the controller 240) with the public key provided by memory unit 210. The communication unit 220 provides the encrypted security information and the protected content to the reception apparatus 120. For example, the communication interface 220 provides the encrypted security information and the protected and unprotected content to the reception apparatus 120 in a transport stream (TS) transmitted via terrestrial broadcast or the Internet.

The communication interface 220 can be implemented using any one or a combination of a terrestrial broadcast transmitter, a cable broadcast transmitter, a satellite uplink transmitter, a network interface (e.g., WLAN card, Ethernet card, etc.), or the like.

Figure 2B:
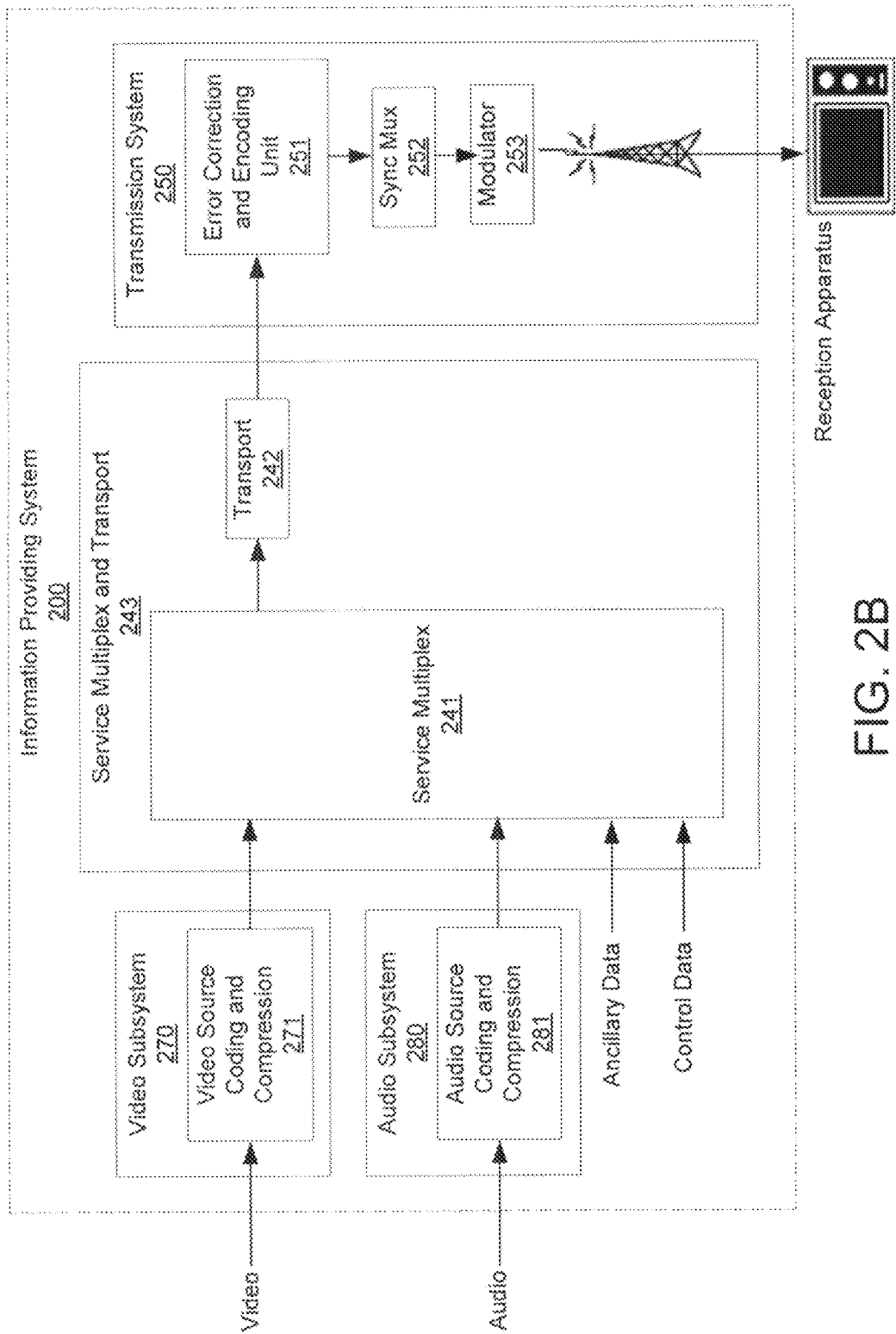
FIG. 2B is another block diagram of an exemplary information providing system.

FIG. 2B is a more detailed block diagram of an embodiment of the information providing system 200. The information providing system 200 includes a video subsystem 270, an audio subsystem 280, a service multiplex and transport system 243, and a transmission system 250. The video and audio subsystems 270, 280 may be combined into a single subsystem in one embodiment.

The video subsystem 270 includes a video source coding and compression system 271 and the audio subsystem 280 includes an audio source coding and compression system 281. Each of the video and audio source coding and compression systems 271, 281, includes at least one encoder configured to compress and/or protect content. The one or more audio and video encoders output audio and video data streams in accordance with one or more predetermined coding methods such as MPEG-2, MPEG-4, etc.

The security encoder 230 is incorporated in the video source coding and compression system 271 and the audio source coding and compression system 281. The video source coding and compression system 271 and the audio source coding and compression system 281 receive the encoder information from the memory 210 and protect the content based on the encoder information (e.g., scrambles the content data according to a scrambling key).

The video source coding and compression system 271 and the audio source coding and compression system 281 provide content compression and coding for video content and audio content respectively. The service multiplex and transport system 243 includes a service multiplex system 241 and a transport system 242. The transmission system 250 includes an error correction and encoding unit 251, a synchronization multiplexer (sync mux) 252, and a modulator 253 (e.g., an 8-VSB modulator in accordance with ATSC standard A/53, which is incorporated herein by reference in its entirety).

Figure 3:
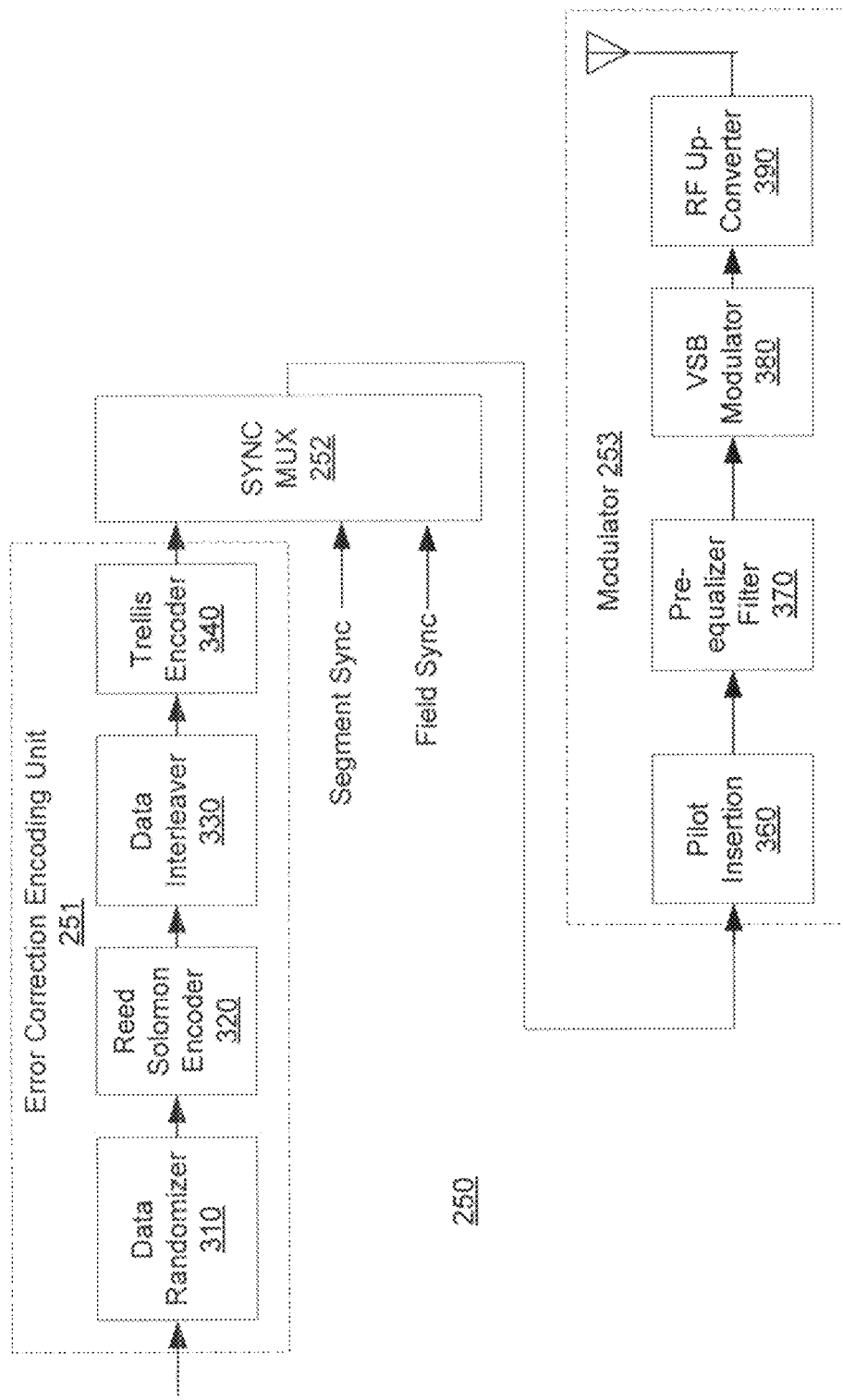
FIG. 3 is a block diagram of an exemplary transmission system.

FIG. 3 illustrates a detailed embodiment of the transmission system 250. As described above with respect to FIG. 2, the transmission system 250 includes an error correction encoding unit 251, a sync mux 252, and a modulator 253.

The error correction encoding unit 251 contains a data randomizer 310, a Reed Solomon encoder 320, a data interleaver 330, and a trellis encoder 340. The error correction encoding unit 251 is used to perform error correction encoding on at least one of the protected and unprotected content prior to multiplexing the protected and unprotected content with synchronization signals (e.g., segment sync and/or field sync signals). The sync mux 252 inserts security information used by the reception apparatus 120 to access the protected content.

The modulator 253 includes a pilot insertion unit 360, an optional pre-equalizer filter 370, a vestigial sideband (VSB) modulator 380, and a RF up-converter 390. However, the modulator 253 may alternatively be configured to utilize other modulation schemes such as an orthogonal frequency-division multiplex (OFDM)-based modulation scheme.

Figure 6A:
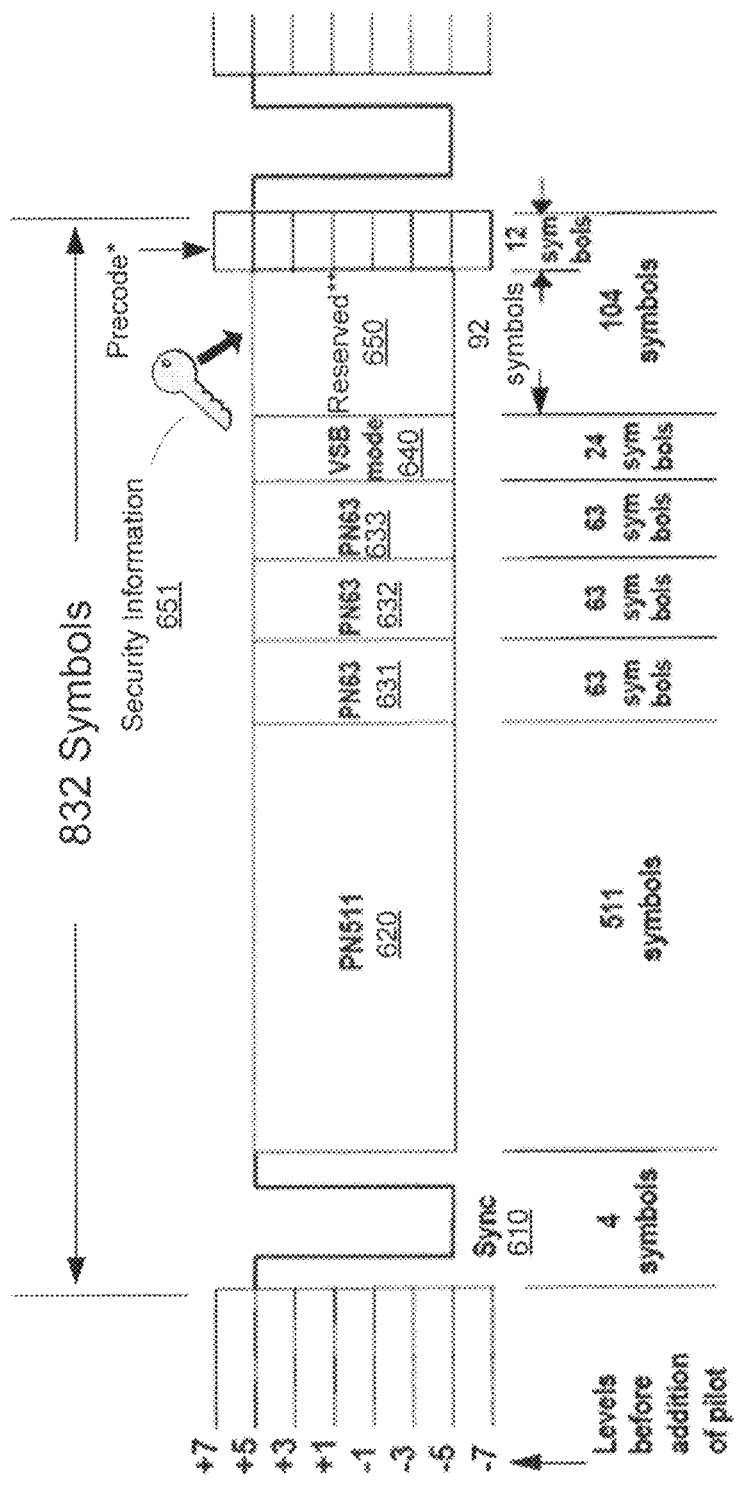
FIG. 6A is a diagram of an exemplary data field sync segment.
Figure 6B:
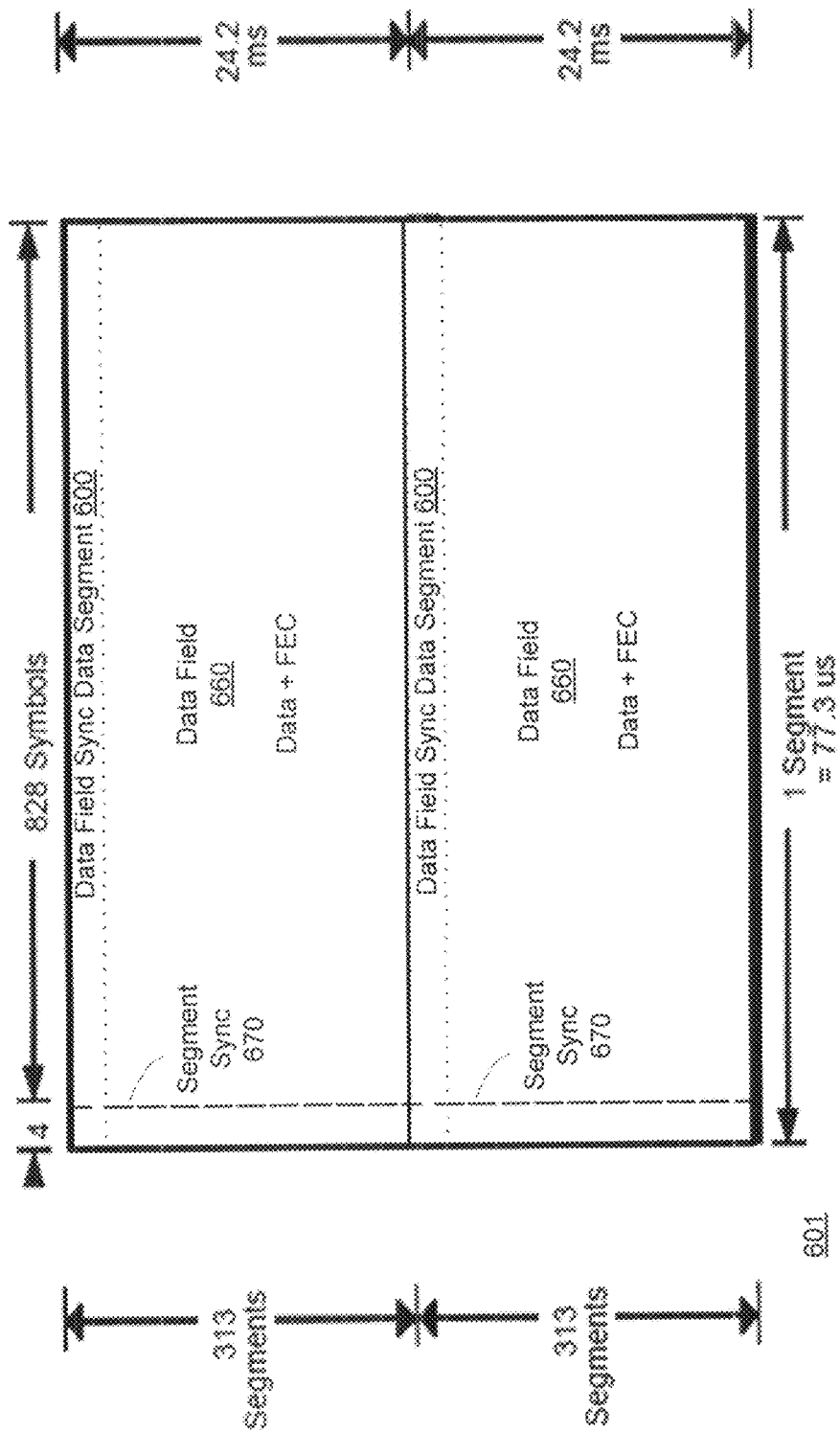
FIG. 6B is a diagram of an exemplary data frame.

An exemplary data format used by the transmission system 250 to transmit protected and unprotected content, and security information, is illustrated in FIG. 6B. FIG. 6B illustrates the RF signal formatting employed in the ATSC A/53. The aforementioned figure illustrates a data frame 601 which includes two data fields 660. Each data field includes a segment sync 670 which includes 313 data segment syncs. The data field sync segment 600 is illustrated in FIG. 6A and includes a 4 symbol data segment sync 610, a 511 symbol pseudo-random sequence 620, three 63 symbol pseudo-random sequences 631, 632, 633, a 24 symbol VSB modulation mode 640, 92 symbols that are reserved 650, and 12 symbols of precode.

Certain embodiments of the present disclosure insert at least a portion of the security information 651 in the 92 symbol reserved portion 650 and/or the 12 symbol precode portion. For example, when one or more enhanced data transmission methods are used, the reserved symbols and precode symbols are numbered 1 to 104 with the 12 precode symbols being preceded by 10 symbols that are used to signal the presence of the enhancement or enhancements. In this case, the security information 651 is inserted in one or more of the 82 remaining symbols.

The RF signal synchronization information is typically thrown away after a correlation peak is found. By inserting security information 651 in the reserved portion 650 of the data field sync segment, the security information 651 can be recovered by a receiving demodulator for use by a video processor or other components to access protected content. Further, inserting the security information in a piece of the RF signal being thrown away by legacy receives allows new receivers to pick up the security information 651 and protect content without breaking the legacy receivers.

According to an embodiment of the present disclosure, the security information 651 is embedded into the transmission by using the reserved portion 650 of the data field sync segment 600 illustrated in FIG. 6A.

The ECM's 48 bit secret key could go through a bit to symbol mapper of 8-VSB to get Field Sync symbols. For example, by taking 3 bit pieces of the 48 bit key and translating those 3 bits to one 8-VSB symbol. 8-VSB uses 3 bit symbols. That would give 16 symbols to insert in the 92 Reserved symbol space, leaving 76 symbols still reserved for other purposes. Another way is to take the security information (82 bit segments) from the ECM packet and encode all that information into 8-VSB symbols. This would give 28 symbols to insert in the 92 Reserved symbol space, still leaving 64 symbols left as reserve.

In one embodiment, the entire ECM packet (82 bytes, or 656 bits) is sent. This method involves taking all bytes and converting them to 219 symbols (656 bits/3 bit symbols). Then 55 symbols of the 92 Reserved symbol space of the Frame Sync are used and the 219 symbols are sent in time over 4 Frames. It takes some time, but may be a more practical way to send the key.

Figure 4:
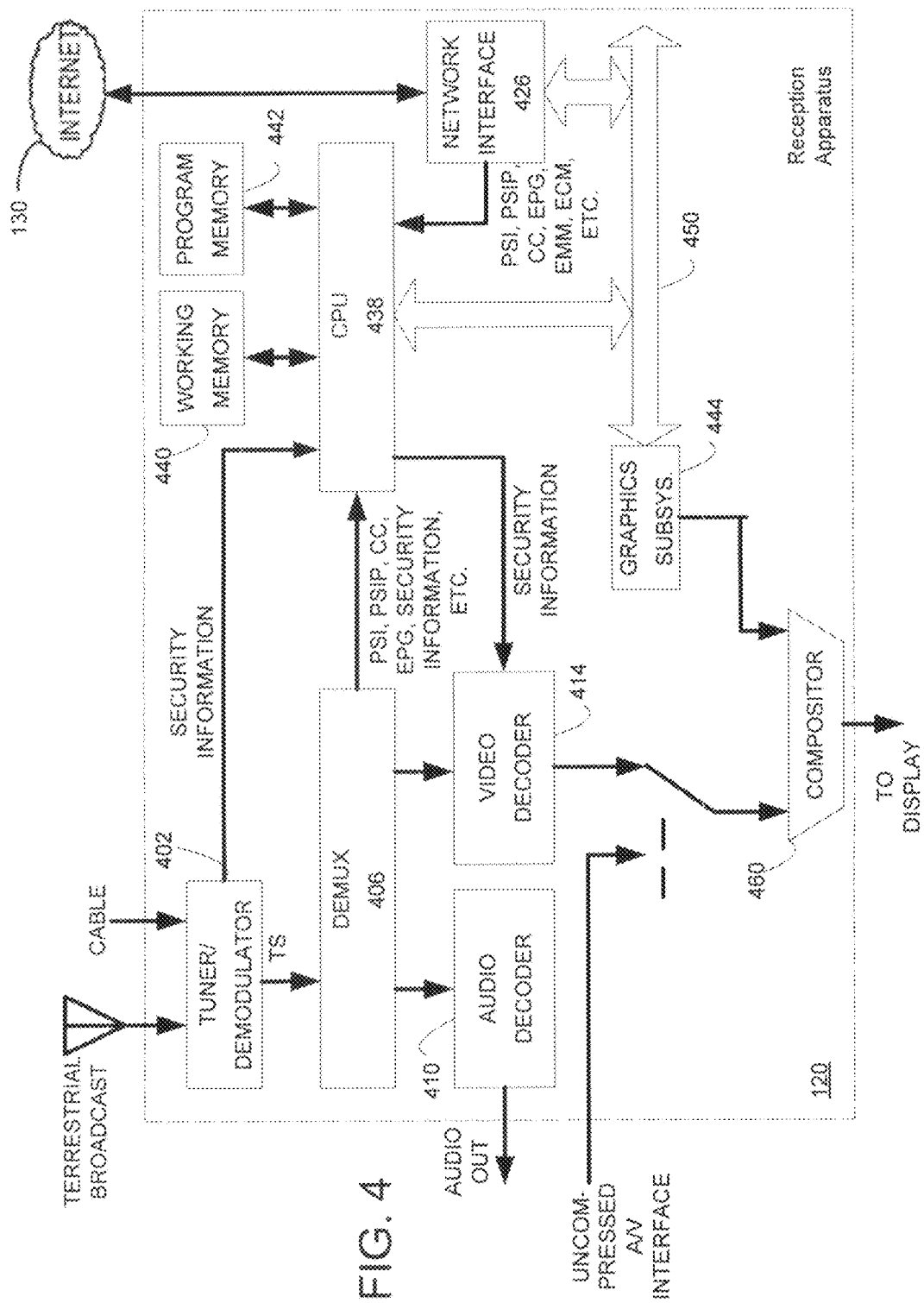
FIG. 4 is a block diagram of an exemplary reception apparatus.

FIG. 4 illustrates an embodiment of the reception apparatus 120. The reception apparatus 120 is a home video processor such as a personal computer, television receiver or DVD recorder, or an information processor such as a Personal Digital Assistant (PDA), mobile phone, tablet, home or portable music player, or home or portable gaming machine. Further, the reception apparatus 120 may be a standalone device or incorporated, for example, in a television set or other consumer electronics device. For example, in one embodiment, the reception apparatus 120 is a digital television receiver device that may be incorporated into a television set or a set top box.

The reception apparatus 120 includes a tuner/demodulator 402, which receives at least one of protected and unprotected content from one or more content sources such as a terrestrial broadcast or a cable television transmission (e.g., information providing system 200). The reception apparatus 120 may also, or alternatively, receive at least one of protected or unprotected content from a satellite broadcast. In one embodiment, the tuner/demodulator 402 is configured to extract security information from the television broadcast signal (e.g., from the data field sync segment 600) and forward it to CPU 438.

The tuner/demodulator 402 receives a transport stream (TS), which is demultiplexed by a demultiplexer (demux) 406 into audio and video (A/V) streams. The audio is decoded by an audio decoder 410 and the video is decoded by a video decoder 414. The audio and/or video decoders 410, 414 are configured to uncompress and/or utilize security information to access protected content. Uncompressed A/V data may be received via an uncompressed A/V interface (e.g., a HDMI interface) that can be selectively utilized.

In one embodiment, the TS includes ancillary information such as one or more of closed caption (CC) data, Program and System Information Protocol (PSIP) information, Program Specific Information (PSIP)), Electronic Program Guide (EPG), security information (e.g., the aforementioned EMMs and ECMs), etc. However, in other embodiments, the A/V content and/or a subset or all of the ancillary information may be received via the Internet 130 and a network interface 426 as illustrated by FIG. 4.

The reception apparatus 120 generally operates under control of at least one processor, such as CPU 438, which is coupled to a working memory 440, program memory 442, and a graphics subsystem 444 via one or more buses (e.g., bus 450). The CPU 438 receives closed caption data from the demultiplexer 406 as well as any other information such as EPGs used for rendering graphics, and passes the information to the graphics subsystem 444. The graphics outputted by the graphics subsystem 444 are combined with video images by the compositor and video interface (compositor) 460 to produce an output suitable for display on a video display.

The CPU 438 also receives and processes the security information (e.g., EMMs and ECMs) from the tuner/demodulator 402, demultiplexer 406, or network interface 426 and sends the security information (e.g., a scrambling key) to the audio decoder 410 and/or the video decoder 414. The audio decoder 410 and/or the video decoder 414 use the security information to access the protected content. Although the audio and video are described as being protected separately, it should be noted that in other embodiments, only one of the audio and video data is protected or the audio and video data are combined into a single data stream to which protection is applied.

Although not illustrated in FIG. 4, the CPU 438 may be coupled to any one or a combination of the reception apparatus 120 resources to centralize control of one or more functions. In one embodiment, the CPU 438 also operates to oversee control of the reception apparatus 120 including the tuner/demodulator 402 and other television resources.

A more processor-centric view of the reception apparatus 120 is illustrated in FIG. 5. Working memory 440 and program memory 442 are depicted collectively as memory 510. Further, a processor 500 includes one or more processing units such as CPU 438. Similarly, the various demodulators, decoders, etc., that initially process digital television broadcast signals are collectively depicted as television receiver/tuner 520. The reception apparatus 120 further includes a remote controller 560 which communicates with a remote controller receiver interface 540. Additionally, the display 550 is connected to a display interface 530, which includes for example the uncompressed A/V interface and/or compositor 460, and is either a display integral to the reception apparatus 120 as in a television set or a connected display device as in the case where the reception apparatus 120 is integrated into a set-top box.

Memory 510 contains various functional program modules and data. The memory 510 stores the data used by the reception apparatus 120. Data stored by the reception apparatus 120 include the security information. The memory 510 within the reception apparatus 120 can be implemented using disc storage form as well as other forms of storage such as non-transitory storage devices including for example network memory devices, magnetic storage elements, magneto-optical storage elements, flash memory, core memory and/or other non-volatile storage technologies.

Network interface 526 is used by the reception apparatus 120 to access one or more communication networks such as the Internet 130. Although the present disclosure primarily describes embodiments in which the security information is provided with the protected content, in other embodiments, the security information is obtained from another location. The location may or may not be provided with the protected content.

For example, the reception apparatus 120 utilizes the network interface 526 to access a server (e.g., broadcast server 140) to obtain security information. In one embodiment, the reception apparatus 120 automatically retrieves the security information based on location information provided in the digital television broadcast signal. In another embodiment, the reception apparatus 120 is redirected to a broadcaster's webpage to acquire the security information in response to the occurrence of a predetermined event. Exemplary events include when the reception apparatus 120 tunes to the broadcaster's channel for the first time, in response to a user's acceptance of a license displayed by the reception apparatus 20, in response to a prompt that enhanced content is available, etc.

As described above, in certain embodiments, a user of the reception apparatus 120 is required to accept a license to access the protected content. The license can be accepted by the user using various methods, such as a user response to a license included in the television broadcast signal or the acceptance of the license via a broadcaster's website.

Figure 7A:
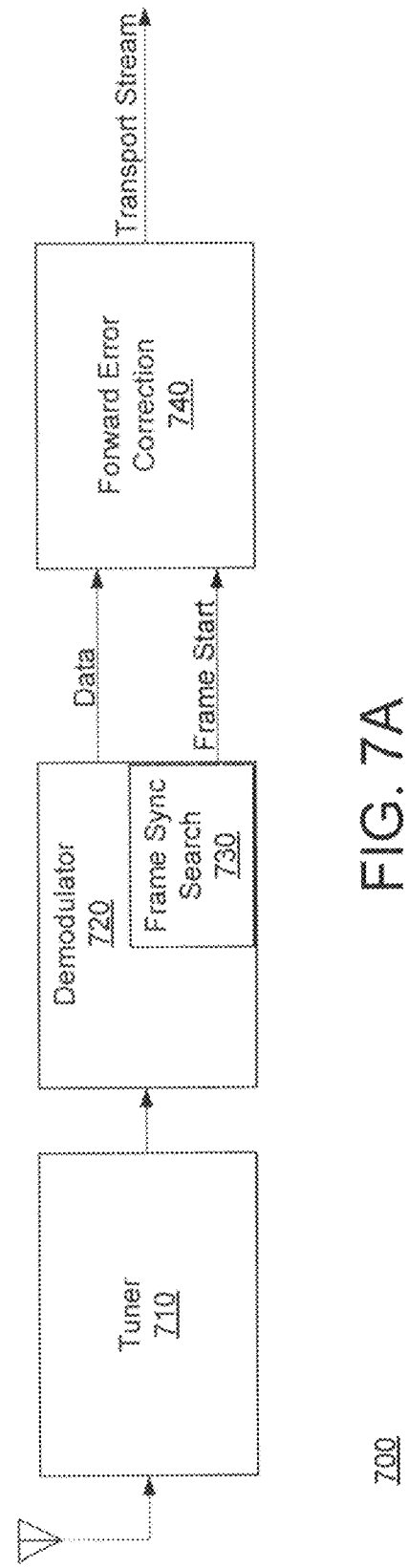
FIG. 7A is an example of a legacy reception apparatus that does not support protected content.

FIG. 7A illustrates a legacy reception apparatus 700 that does not support protected content. The legacy reception apparatus 700 includes a tuner 710, a demodulator 720, and a forward error correction (FEC) unit 740. The demodulator 720 further includes a frame sync search unit 730. Frame sync search unit 730 uses the pseudo-random sequences 620, 631, 632, 633 in the data field sync segment 600 to synchronize when FEC by the FEC unit 740 should start. When synchronized, the trellis decoding operation begins and the remainder of the data field sync segment 600 is ignored by the reception apparatus 700. That is, the frame sync and segment sync are stripped away from the data and thrown away.

Figure 7B:
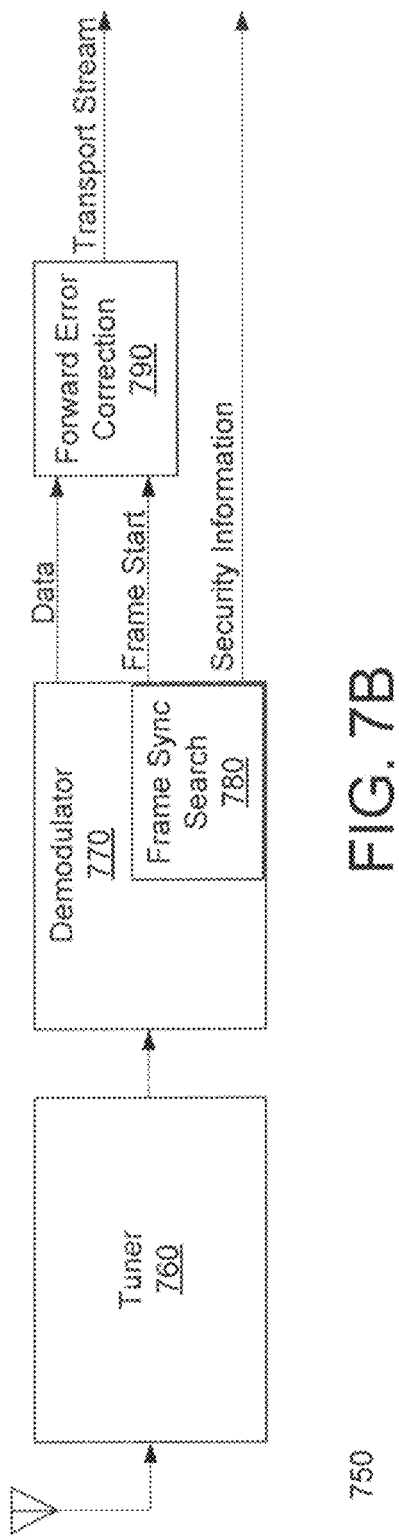
FIG. 7B is an example of a reception apparatus that supports protected content.

FIG. 7B illustrates a reception apparatus 750, which is configured to support protected content. The reception apparatus 750 includes a tuner 760, a demodulator 770, and a FEC unit 790. The demodulator 770 includes a frame sync search unit 780. According to an embodiment of the present disclosure, the frame sync search unit 780 also uses the pseudo-random sequences 620, 631, 632, 633 in the data field sync segment 600 to synchronize the FEC unit with the start of the data field 660. Further, the frame sync search unit 780 also begins the trellis decoding operation when the FEC unit is synchronized. However, the frame sync search system 780 continues to process the data field sync segment 600 after FEC synchronization in order to obtain security information 651 and use it to access the protected content.

Figure 8:
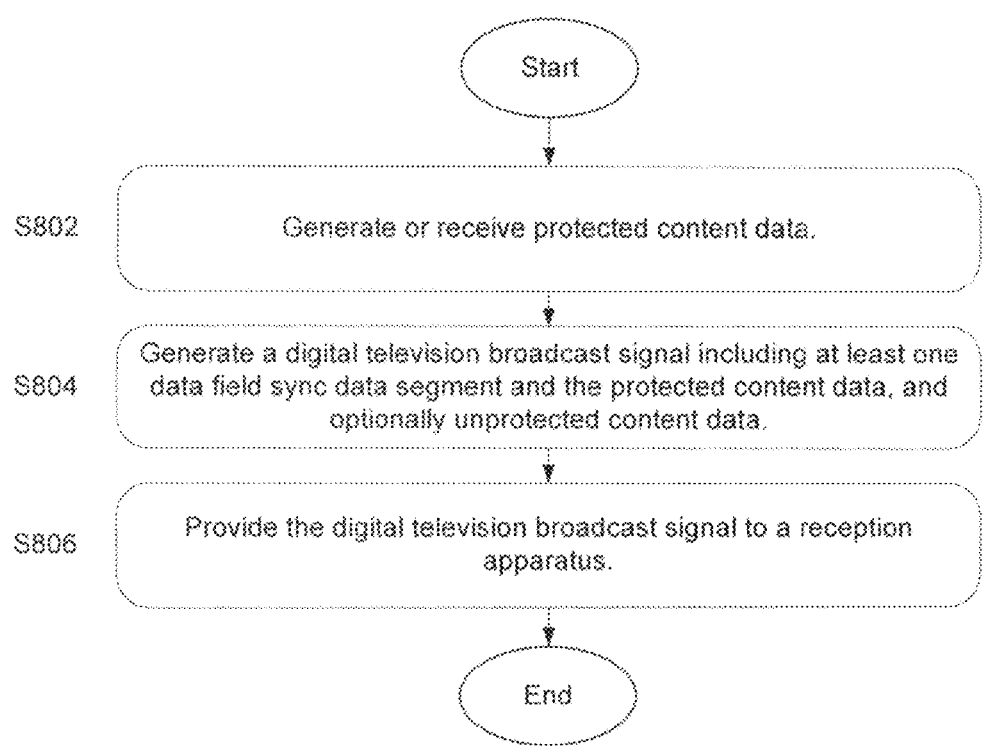
FIG. 8 is a flow diagram of an exemplary method for providing protected content.

FIG. 8 is a flow diagram of an exemplary method for distributing protected content data. In step S802, an information providing system 200 generates or receives protected content data. In step S804, the information providing system 200 generates a digital television broadcast signal including at least one data field sync segment and the protected content data. In one embodiment, the digital television broadcast signal includes at least one data field sync segment, and both protected and unprotected content data which were for example previously combined into a single TS.

In step S806, the digital television broadcast signal is provided to a reception apparatus 120. The at least one data field sync segment carries information necessary to identify a framing structure of the digital television broadcast signal and includes one of security information for accessing the protected content data and a location of the security information. Depending on size, the entire security information or location of the security information is contained in a single data field sync segment or different portions thereof are divided into a plurality of different data field sync segments.

Figure 9:
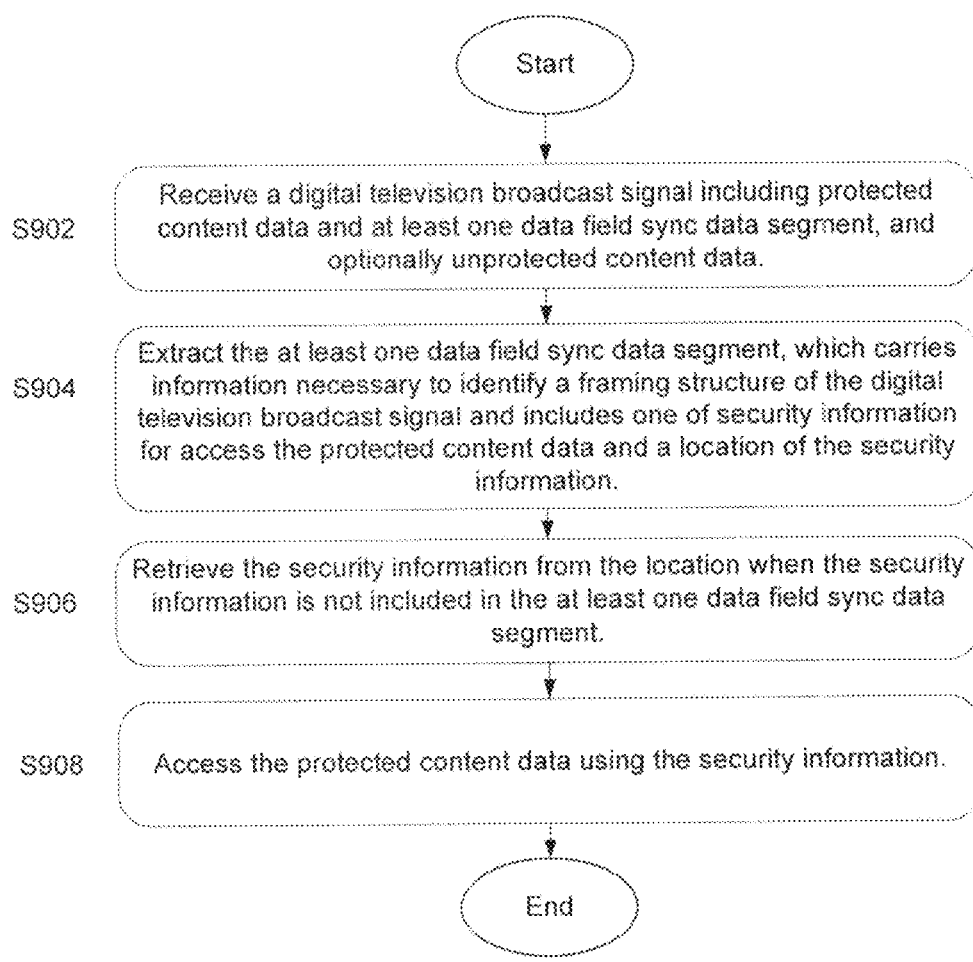
FIG. 9 is a flow diagram of an exemplary method for receiving protected content.

FIG. 9 is a flow diagram of an exemplary method for receiving protected content data. In step S902, a reception apparatus 120 receives a digital television broadcast signal including the protected content data and at least one data field sync segment. In one embodiment, the protected content data is multiplexed with unprotected content data and, for example, included in a TS.

In step S904, the at least one data field sync segment is extracted. The at least one data field sync data segment carries information necessary to identify a framing structure of the digital television broadcast signal and includes one of security information for accessing the protected content data and a location of the security information. Depending on the embodiment, the entire security information or location of the security information is contained in a single data field sync segment or different portions thereof are divided into a plurality of different data field sync segments.

In step S906, the reception apparatus 120 retrieves the security information from the location of the security information, when the security information is not included in the at least one data field sync. In step S908, the reception apparatus 120 accesses (e.g., descrambles or otherwise decodes) the protected content data using the security information.

Although FIGS. 8 and 9 have been described using an example in which the security information, or location of the security information, contained in the data field sync, it should be noted that the security information, or location thereof, can be contained in other portions of the digital television broadcast signal. For example, the security information, or location thereof, could be placed in a Kasami sequence via RF watermarking, an unused closed caption service (e.g., service #6) or otherwise embedded in unprotected content data that provided along with the protected content data. In other embodiments, the security information, or location thereof, is provided via another communication network such as the Internet.

Figure 10:
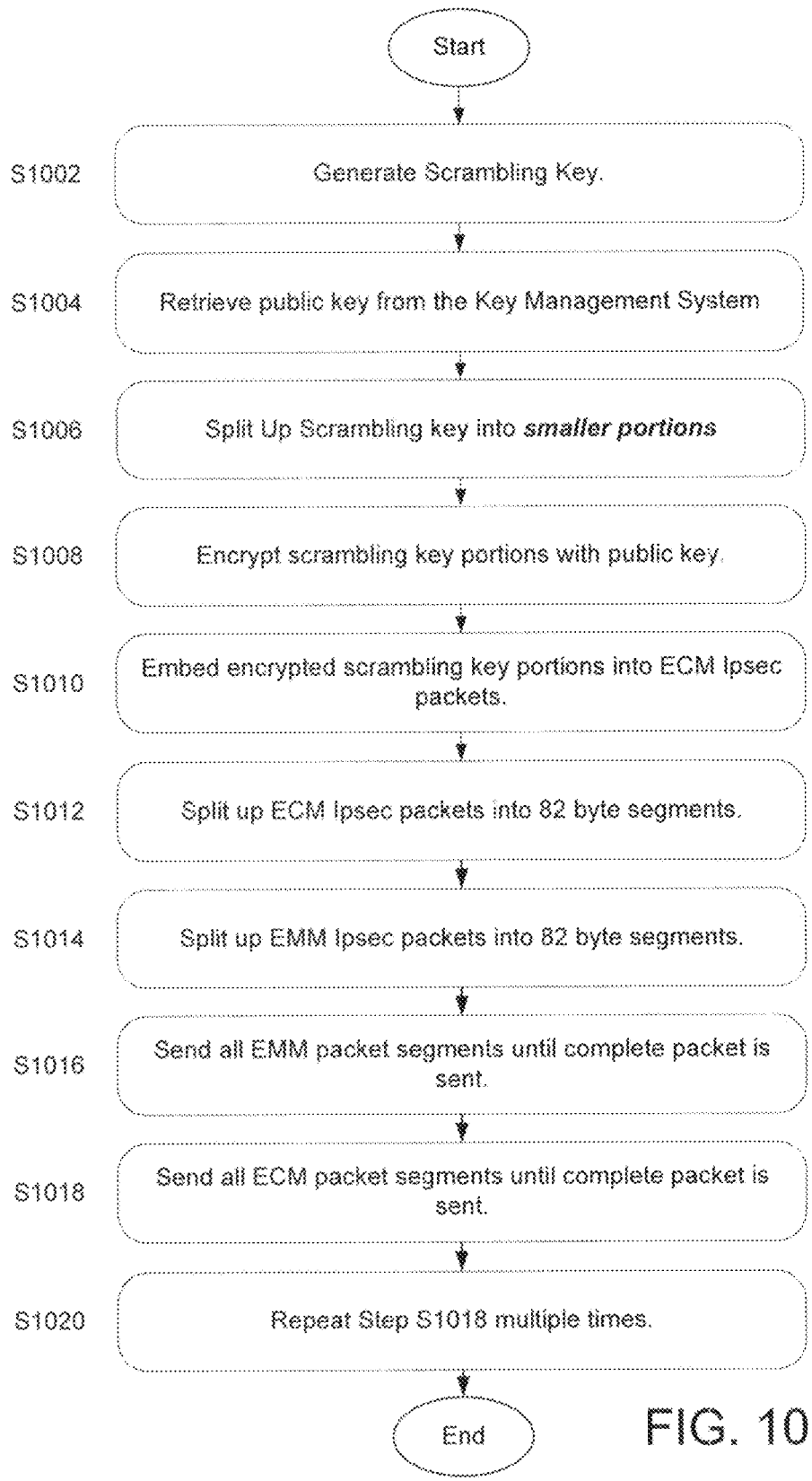
FIG. 10 is a flow diagram of an exemplary method for generating and transmitting security information.

FIG. 10 provides a detailed overview of an exemplary method for generating and transmitting the aforementioned EMM and ECM packets. The EMM and/or ECM packets are provided in at least one data field sync or another portion of the digital television broadcast signal in certain embodiments. In step S1002, the information providing system 200 generates a scrambling key (i.e., security information) to scramble content data to be protected. In step S1004, a public key is retrieved from a key management system by the information providing system 200 which is used to encrypt the scrambling key. In step S1006, the scrambling key is split up into smaller portions which could fit into an Ipsec packet segment which could fit in a reserved portion 650 of the data field sync segment 600 which is illustrated in FIG. 6A. In step S1008, the scrambling key portions are encrypted with the public key which was received by the information providing system 200. In step S1010, the encrypted scrambling key portions are embedded into ECM Ipsec packets. In step S1012, the ECM Ipsec packets are split into 82 byte segments. In step S1014, the EMM Ipsec packets are split into 82 byte segments. In step S1016, all of the EMM packet segments are sent until a complete packet is sent. In step S1018, all of the ECM packet segments are sent until a complete packet is sent. In step S1020, step S1018 is repeated a large (and variable) number of times. The reception apparatus 120 uses EMM packets in order to detect, receive, and decrypt ECM packets in order to obtain the scrambling key needed for descrambling scrambled content data (i.e., protected content data). The EMM is transported as an IPsec UDP/IP packet. The EMM is used to authorize the reception apparatus 120 to decrypt the associated ECM packets and obtain the 48 bit secret key needed for descrambling the scrambled content data. An EMM generator, which is included in the conditional access system, sends an EMM to the reception apparatus 120. The EMM contains a SPI which the reception apparatus 120 uses to search for the appropriate ECM packets to decrypt.

Figure 11:
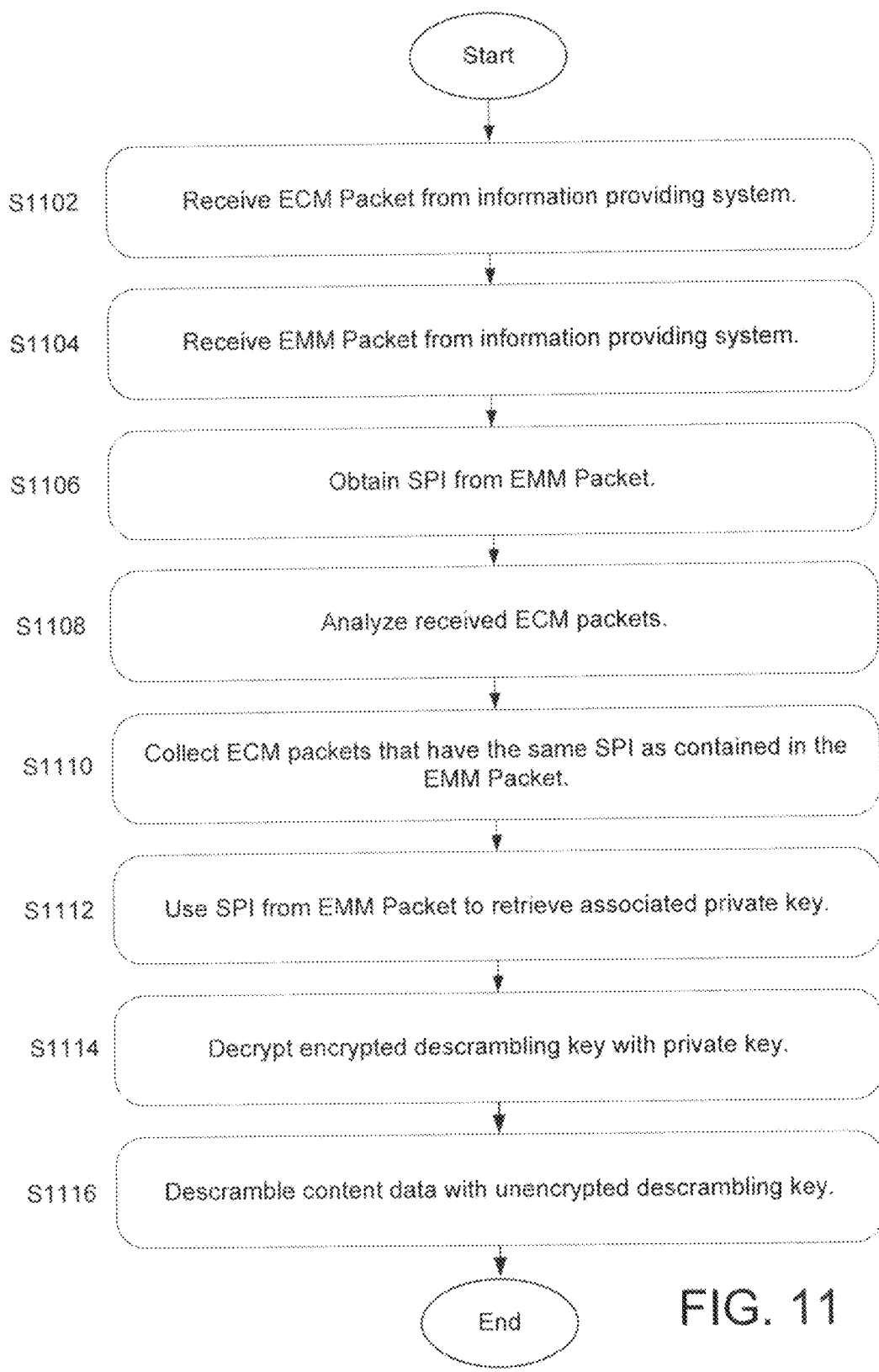
FIG. 11 is a flow diagram of an exemplary method for accessing protected content using security information.

According to an embodiment of the present disclosure, the ECM packet detection, reception, and decryption process is illustrated in FIG. 11. In step S1102, the reception apparatus 120 receives an ECM packet from the information providing apparatus 200. In step S1104, the reception apparatus 120 receives an EMM packet from the information providing system 200. As described above, one or a combination of the ECM and EMM packets is contained in at least one data field sync segment or another portion of the digital television broadcast signal according to certain embodiments. In one embodiment, the one or the combination of the ECM and EMM packets is contained in 4 frames. In step S1106, the reception apparatus 120 obtains an SPI from the EMM packet. In step S1108, the reception apparatus 120 analyzes the received ECM packets and in step S1110, the reception apparatus 120 collects the ECM packets that have the same SPI as contained in the aforementioned EMM packet. In step S1112, the reception apparatus 120 uses the SPI from the EMM packet to retrieve the associated private key. In step S1114, the reception apparatus 120 decrypts the encrypted scrambling key with the private key. In step S1116, the reception apparatus 120 descrambles the scrambled content data with the unencrypted scrambling key. In other embodiments, the scrambling key(s) is sent directly to the reception apparatus 120 without the ECM packet(s).

Figure 12:
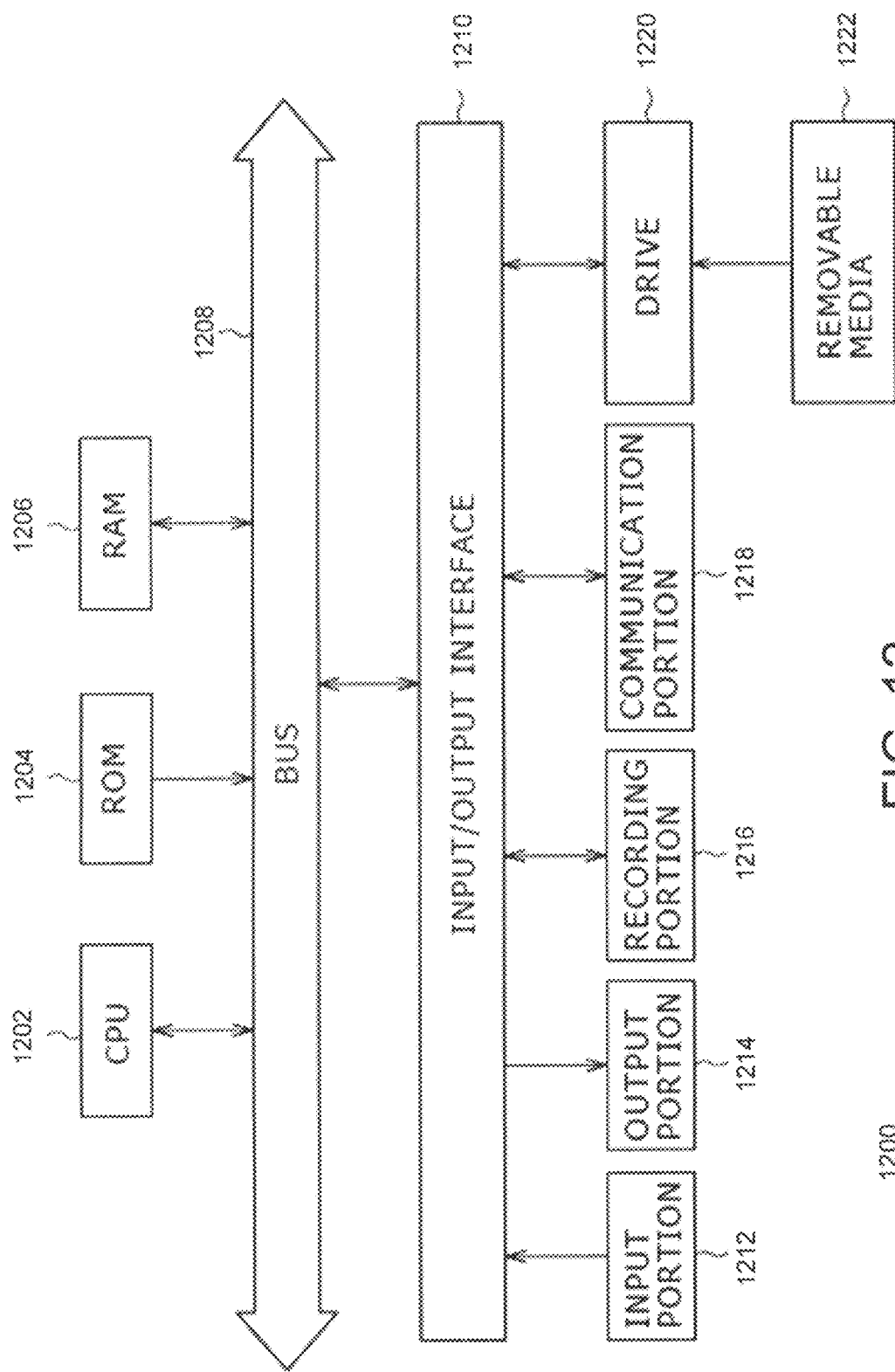
FIG. 12 is an exemplary computer.

FIG. 12 is a block diagram showing an example of a hardware configuration of a computer 1200 that can be configured to function as, control, or incorporate, any one or a combination of the information providing system 200, reception apparatus 120, and components thereof (e.g., content source 110, broadcast server 140).

As illustrated in FIG. 12, the computer 1200 includes a central processing unit (CPU) 1202, read only memory (ROM) 1204, and a random access memory (RAM) 1206 interconnected to each other via one or more buses 1208. The one or more buses 1208 is further connected with an input-output interface 1210. The input-output interface 1210 is connected with an input portion 1212 formed by a keyboard, a mouse, a microphone, remote controller, etc. The input-output interface 810 is also connected to a output portion 1214 formed by an audio interface, video interface, display, speaker, etc.; a recording portion 1216 formed by a hard disk, a non-volatile memory, etc.; a communication portion 1218 formed by a network interface, modem, USB interface, fire wire interface, etc.; and a drive 1220 for driving removable media 1222 such as a magnetic disk, an optical disk, a magneto-optical disk, a semiconductor memory, etc.

According to one embodiment, the CPU 1202 loads a program stored in the recording portion 1216 into the RAM 1206 via the input-output interface 1210 and the bus 1208, and then executes a program configured to provide the functionality of the one or combination of the information providing system 200, reception apparatus 120, and components thereof (e.g., content source 110, broadcast server 140).

Although embodiments of the present disclosure are discussed with respect to providing protected content on terrestrial broadcast channels, more particularly television broadcast channels, the present disclosure is applicable to radio station broadcasts, satellite broadcasts, and any other communication method in which conditional access to content, for example by license, is needed.

The various processes discussed above need not be processed chronologically and/or in the sequence depicted as flowcharts; the steps may also include those processed in parallel or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a system, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present disclosure are possible in light of the above teachings. It is therefore to be understood that within the scope of the appended claims, the present disclosure may be practiced otherwise than as specifically described herein.

The above disclosure also encompasses the embodiments noted below.

(1) A method of an information providing system for providing protected content data to a reception apparatus, the method comprising: generating or receiving the protected content data; generating, by a signal generator of the information providing system, a digital television broadcast signal including at least one data field sync segment and the protected content data; and providing the digital television broadcast signal to the reception apparatus, wherein the at least one data field sync segment carries information necessary to identify a framing structure of the digital television broadcast signal and includes one of security information for accessing the protected content data and a location of the security information.

(2) The method of feature (1), in which each of the at least one data field sync segment is defined by 832 symbols and includes a reserved portion corresponding to symbols 729 to 820, and at least a portion of the security information or location of the security information is included in the reserved portion of one of the at least one data field sync segment.

(3) The method of features (1) or (2), in which the security information or location of the security information is included within symbols 729 to 810 of the at least one data field sync segment.

(4) The method of any of features (1) to (3), in which symbols 1 to 4 define a data segment sync that identifies the beginning of each of the at least one data field sync segment, symbols 5 to 515 define a 511-symbol pseudo-random sequence, symbols 516 to 704 define three 63-symbol pseudo-random sequences, and symbols 705 to 728 define identify a vestigial sideband modulation (VSB) mode of the digital television broadcast signal.

(5) The method of any of features (1) to (4), in which the entire security information or location of the security information is included in one data field sync segment.

(6) The method of any of features (1) to (5), in which the digital television broadcast signal includes a plurality of data field sync segments and the protected content data, each of the plurality of data field sync segments including a different portion of the security information or location of the security information.

(7) The method of any of features (1) to (6), further including performing error correction encoding on the protected content data prior to performing the step of generating the digital television broadcast signal.

(8) A non-transitory computer-readable storage medium storing a program which, when executed by a computer, causes the computer to perform the method of any of features (1) to (7).

(9) An information providing system, comprising: a content subsystem configured to generate or receive protected content data; a signal generator configured to generate a digital television broadcast signal including at least one data field sync segment and the protected content data; and a transmission subsystem configured to provide the digital television broadcast signal to a reception apparatus, wherein the at least one data field sync segment carries information necessary to identify a framing structure of the digital television broadcast signal and includes one of security information for accessing the protected content data and a location of the security information.

(10) The information providing system of feature (9), in which each of the at least one data field sync segment is defined by 832 symbols and includes a reserved portion corresponding to symbols 729 to 820, and at least a portion of the security information or location of the security information is included in the reserved portion of one of the at least one data field sync segment.

(11) The information providing system of feature (9) or (10), in which the security information or location of the security information is included within symbols 728 to 810 of the at least one data field sync segment.

(12) The information providing system of any of features (9) to (11), in which symbols 1 to 4 define a data segment sync that identifies the beginning of each of the at least one data field sync segment, symbols 5 to 515 define a 511-symbol pseudo-random sequence, symbols 516 to 704 define three 63-symbol pseudo-random sequences, and symbols 705 to 728 define identify a vestigial sideband modulation (VSB) mode of the digital television broadcast signal.

(13) The information providing system of any of features (9) to (12), in which the entire security information or location of the security information is included in one data field sync segment.

(14) The information providing system of any of features (9) to (13), in which the digital television broadcast signal includes a plurality of data field sync segments and the protected content data, each of the plurality of data field sync segments including a different portion of the security information or location of the security information.

(15) The information providing system of any of features (9) to (14), further including an error correction encoder configured to perform error correction encoding on the protected content data prior to the digital television broadcast signal being generated by the signal generator.

(16) A method of a reception apparatus for receiving protected content data, the method comprising: receiving, by the reception apparatus, a digital television broadcast signal including the protected content data and at least one data field sync segment; extracting the at least one data field sync segment, which carries information necessary to identify a framing structure of the digital television broadcast signal and includes one of security information for accessing the protected content data and a location of the security information, retrieving the security information from the location of the security information, when the security information is not included in the at least one data field sync, and accessing the protected content data using the security information.

(17) The method of feature (16), in which each of the at least one data field sync segment is defined by 832 symbols and includes a reserved portion corresponding to symbols 729 to 820, and at least a portion of the security information or location of the security information is included in the reserved portion of one of the at least one data field sync segment.

(18) A non-transitory computer-readable storage medium storing a program which, when executed by a computer, causes the computer to perform the method of feature (16) or (17).

(19) A reception apparatus, comprising: a tuner configured to receive, a digital television broadcast signal including protected content data and at least one data field sync segment; a demodulator configured to extract the at least one data field sync segment, which carries information necessary to identify a framing structure of the digital television broadcast signal and includes one of security information for accessing the protected content data and a location of the security information; and processing circuitry configured to retrieve the security information from the location of the security information, when the security information is not included in the data field sync, and access the protected content data using the security information.

(20) The method of feature (19), in which each of the at least one data field sync segment is defined by 832 symbols and includes a reserved portion corresponding to symbols 729 to 820, and at least a portion of the decryption key or location of the decrypted content is included in the reserved portion of one of the at least one data field sync segment.

The invention claimed is:

1. A method of a reception apparatus for receiving protected content data and unprotected content data, the method comprising:
receiving, by circuitry of the reception apparatus, a digital television broadcast signal including the protected content data, the unprotected data, and at least one data area including defined symbols and reserved symbols;
extracting, by the circuitry of the reception apparatus, the at least one data area, which carries information necessary to identify a framing structure of the digital television broadcast signal and includes one of security information for accessing the protected content data and a location of the security information;
retrieving, by the circuitry of the reception apparatus, the security information from the location of the security information, when the security information is not included in the at least one data area;
accessing, by the circuitry of the reception apparatus, the protected content data using the security information, wherein the protected content data includes a higher resolution layer of a video included in the unprotected content data, the unprotected content data being separate from the protected content data; and
combining, by the circuitry of the reception apparatus, content from the protected and unprotected content data to generate a higher resolution version of the video for display to a user, wherein
the one of the security information and the location of the security information is included in a number of the reserved symbols in one or more of the at least one data area.

2. A non-transitory computer-readable storage medium storing a program which, when executed by a computer, causes the computer to perform a method for receiving protected content data and unprotected content data, the method comprising:
receiving a digital television broadcast signal including the protected content data, the unprotected data, and at least one data area including defined symbols and reserved symbols;
extracting the at least one data area, which carries information necessary to identify a framing structure of the digital television broadcast signal and includes one of security information for accessing the protected content data and a location of the security information;
retrieving the security information from the location of the security information, when the security information is not included in the at least one data area;
accessing the protected content data using the security information, wherein the protected content data includes a higher resolution layer of a video included in the unprotected content data, the unprotected content data being separate from the protected content data; and
combining content from the protected and unprotected content data to generate a higher resolution version of the video for display to a user, wherein
the one of the security information and the location of the security information is included in a number of the reserved symbols in one or more of the at least one data area.

3. A reception apparatus, comprising:
circuitry configured to
receive a digital television broadcast signal including protected content data, unprotected content data, and at least one data area including defined symbols and reserved symbols;
extract the at least one data area, which carries information necessary to identify a framing structure of the digital television broadcast signal and includes one of security information for accessing the protected content data and a location of the security information;
retrieve the security information from the location of the security information, when the security information is not included in the at least one data area;
access the protected content data using the security information, wherein the protected content data includes a higher resolution layer of a video included in the unprotected content data, the unprotected content data being separate from the protected content data; and
combine content from the protected and unprotected content data to generate a higher resolution version of the video for display to a user, wherein
the one of the security information and the location of the security information is included in a number of the reserved symbols in one or more of the at least one data area.

4. The reception apparatus according to claim 3, wherein the number of reserved symbols in the one or more of the at least one data area is not processed when the reception apparatus is not authorized to access the protected content data.

5. The method according to claim 1, wherein the number of reserved symbols in the one or more of the at least one data area is not processed when the reception apparatus is not authorized to access the protected content data.

6. The non-transitory computer-readable medium according to claim 2, wherein the number of reserved symbols in the one or more of the at least one data area is not processed when the reception apparatus is not authorized to access the protected content data.

* * * * *